United States Patent
Bloesch et al.

(10) Patent No.: US 10,169,389 B2
(45) Date of Patent: *Jan. 1, 2019

(54) METADATA DRIVEN REPORTING AND EDITING OF DATABASES

(71) Applicant: Microsoft Technology Licensing, LLC, Redmond, WA (US)

(72) Inventors: Anthony Christopher Bloesch, Vashon, WA (US); Siddharth Jayadevan, Seattle, WA (US); James R. Flynn, Seattle, WA (US); Antony Scott Williams, Mercer Island, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 197 days.

This patent is subject to a terminal disclaimer.

(21) Appl. No.: 15/182,935

(22) Filed: Jun. 15, 2016

(65) Prior Publication Data

US 2016/0299930 A1  Oct. 13, 2016

Related U.S. Application Data

(60) Continuation of application No. 14/018,684, filed on Sep. 5, 2013, now Pat. No. 9,372,876, which is a
(Continued)

(51) Int. Cl.
*G06F 17/30* (2006.01)
*G06F 11/14* (2006.01)

(52) U.S. Cl.
CPC .... *G06F 17/30342* (2013.01); *G06F 11/1435* (2013.01); *G06F 17/301* (2013.01);
(Continued)

(58) Field of Classification Search
CPC ......... G06F 17/30286; G06F 17/30525; G06F 17/30463; G06F 17/3041; G06F 17/30923;
(Continued)

(56) References Cited

U.S. PATENT DOCUMENTS 5,717,924 A   2/1998 Kawai
5,721,903 A   2/1998 Anand et al.
(Continued)

FOREIGN PATENT DOCUMENTS

WO      0190949 A1    11/2001
WO   WO2004088664 A2 * 10/2004
(Continued)

OTHER PUBLICATIONS

"Final Office Action Issued in U.S Appl. No. 11/925,739", dated Aug. 29, 2013, 18 Pages.
(Continued)

*Primary Examiner* — Srirama Channavajjala
(74) *Attorney, Agent, or Firm* — Workman Nydegger

(57) ABSTRACT

A computer system identifies an information set stored at a data store. The computer system then identifies first metadata that includes first instructions indicating how the information set is to present a plurality of data items, and second pre-existing metadata that includes second instructions indicating how the information set is to present the plurality of data items. The computer system determines that a portion of the first metadata will override a portion of the second metadata, to create combined metadata. The computer system provides the combined metadata to the information set, including combining the second metadata with the first metadata by at least overriding the second instructions of the second metadata with the first instructions of the first metadata. The computer system presents the plurality of data items in accordance with the second metadata, at least as modified by the first instructions of the first metadata.

14 Claims, 4 Drawing Sheets

Related U.S. Application Data division of application No. 11/925,739, filed on Oct. 26, 2007, now Pat. No. 8,903,842.

(52) U.S. Cl.
CPC .... *G06F 17/3038* (2013.01); *G06F 17/30289* (2013.01); *G06F 17/30292* (2013.01); *G06F 17/30345* (2013.01); *G06F 17/30386* (2013.01); *G06F 17/30389* (2013.01); *G06F 17/30525* (2013.01); *G06F 17/30563* (2013.01); *G06F 17/30589* (2013.01)

(58) Field of Classification Search
CPC ........... G06F 17/30353; G06F 17/3089; G06F 17/30436; G06F 17/30595; G06F 17/30342; G06F 17/3038; G06F 17/30386; G06F 17/30563; G06F 17/30384; G06F 17/30289; G06F 17/30292; G06F 17/30345; G06F 17/30589

See application file for complete search history.

(56) References Cited

U.S. PATENT DOCUMENTS

| | | | |
|---|---|---|---|
| 5,721,911 | A | 2/1998 | Ha et al. |
| 6,115,717 | A | 9/2000 | Mehrotra et al. |
| 6,260,040 | B1 | 7/2001 | Kauffman et al. |
| 6,275,824 | B1 | 8/2001 | O'Flaherty et al. |
| 6,418,428 | B1 | 7/2002 | Bosch et al. |
| 6,493,720 | B1 * | 12/2002 | Chu ................... G06F 17/30353 |
| 6,557,002 | B1 | 4/2003 | Fujieda et al. |
| 6,574,631 | B1 | 6/2003 | Subramanian et al. |
| 6,714,943 | B1 | 3/2004 | Ganesh et al. |
| 6,760,721 | B1 | 7/2004 | Chasen et al. |
| 6,928,431 | B2 * | 8/2005 | Dettinger ........... G06F 17/30389 |
| 6,996,556 | B2 * | 2/2006 | Boger ............... G06F 17/30463 |
| 7,051,038 | B1 | 5/2006 | Yeh et al. |
| 7,058,620 | B1 * | 6/2006 | Mandel, III ........ G06F 17/3041 |
| 7,072,896 | B2 | 7/2006 | Lee et al. |
| 7,152,070 | B1 | 12/2006 | Musick et al. |
| 7,185,061 | B1 | 2/2007 | Gopal et al. |
| 7,401,064 | B1 | 7/2008 | Arone et al. |
| 7,603,438 | B2 | 10/2009 | Daos et al. |
| 7,620,936 | B2 | 11/2009 | Ernst et al. |
| 7,756,895 | B1 | 7/2010 | Emigh |
| 7,853,554 | B2 | 12/2010 | Wan |
| 8,046,341 | B2 * | 10/2011 | Shinkai ................ G11B 27/034 707/695 |
| 8,903,842 | B2 | 12/2014 | Bloesch et al. |
| 9,372,876 | B2 * | 6/2016 | Bloesch ............ G06F 17/30525 |
| 2001/0034733 | A1 * | 10/2001 | Prompt ............. G06F 17/30893 |
| 2002/0059195 | A1 | 5/2002 | Cras et al. |
| 2002/0120634 | A1 | 8/2002 | Min et al. |
| 2002/0196276 | A1 | 12/2002 | Corl et al. |
| 2003/0028511 | A1 | 2/2003 | Sluiman |
| 2003/0120665 | A1 | 6/2003 | Fox et al. |
| 2003/0182282 | A1 | 9/2003 | Ripley |
| 2003/0182308 | A1 | 9/2003 | Ernst et al. |
| 2003/0204481 | A1 | 10/2003 | Lau |
| 2004/0002972 | A1 * | 1/2004 | Pather ..................... G06F 9/542 |
| 2004/0107197 | A1 | 6/2004 | Shen et al. |
| 2004/0153474 | A1 | 8/2004 | Li et al. |
| 2004/0181534 | A1 | 9/2004 | Mortensen et al. |
| 2004/0186860 | A1 | 9/2004 | Lee et al. |
| 2005/0015377 | A1 | 1/2005 | Wan |
| 2005/0015753 | A1 * | 1/2005 | Meijer .................... G06F 9/449 717/136 |
| 2005/0065966 | A1 | 3/2005 | Diab |
| 2005/0080802 | A1 | 4/2005 | Cras et al. |
| 2005/0125411 | A1 | 6/2005 | Kilian et al. |
| 2005/0149583 | A1 | 7/2005 | Baskaran et al. |
| 2005/0278270 | A1 * | 12/2005 | Carr ....................... G06Q 10/10 706/25 |
| 2006/0004815 | A1 * | 1/2006 | Murata ............. G06F 17/30286 |
| 2006/0031811 | A1 | 2/2006 | Ernst et al. |
| 2006/0155689 | A1 | 7/2006 | Blakeley et al. |
| 2006/0155716 | A1 | 7/2006 | Vasishth et al. |
| 2006/0173808 | A1 | 8/2006 | Peterson et al. |
| 2006/0271528 | A1 | 11/2006 | Gorelik |
| 2007/0073712 | A1 | 3/2007 | Falk et al. |
| 2007/0073765 | A1 | 3/2007 | Chen |
| 2007/0088726 | A1 | 4/2007 | Daos et al. |
| 2007/0208685 | A1 * | 9/2007 | Blumenau ......... G06F 17/30997 |
| 2007/0253679 | A1 | 11/2007 | Tanaka et al. |
| 2008/0065678 | A1 * | 3/2008 | Petri ................. G06F 17/30923 |
| 2008/0071812 | A1 | 3/2008 | Baby et al. |
| 2008/0071844 | A1 | 3/2008 | Gopal et al. |
| 2008/0077709 | A1 | 3/2008 | Zhuang |
| 2008/0104032 | A1 | 5/2008 | Sarkar |
| 2008/0147704 | A1 | 6/2008 | Godwin et al. |
| 2008/0155430 | A1 * | 6/2008 | Prager .................... G06Q 10/10 715/751 |
| 2008/0162590 | A1 | 7/2008 | Kundu et al. |
| 2008/0168109 | A1 | 7/2008 | Gaurav et al. |
| 2008/0256354 | A1 * | 10/2008 | Blumenau ......... G06F 17/30997 713/153 |
| 2009/0031230 | A1 | 1/2009 | Kesler |
| 2009/0100084 | A1 | 4/2009 | Jayadevan et al. |
| 2009/0112801 | A1 | 4/2009 | Bloesch et al. |
| 2009/0202228 | A1 | 8/2009 | Tanaka et al. |
| 2010/0048921 | A1 | 2/2010 | Tanaka et al. |
| 2014/0012883 | A1 | 1/2014 | Bloesch et al. |
| 2016/0299930 | A1 * | 10/2016 | Bloesch ............ G06F 17/30525 |

FOREIGN PATENT DOCUMENTS

| | | | |
|---|---|---|---|
| WO | | 2006036127 A1 | 4/2006 |
| WO | WO 2007/038408 | * | 4/2007 |

OTHER PUBLICATIONS

"Final Office Action Issued in U.S Appl. No. 11/925,739", dated Aug. 6, 2010, 43 Pages.

"Non-Final Office Action Issued in U.S Appl. No. 11/925,739", dated Apr. 19, 2013, 14 Pages.

"Non-Final Office Action Issued in U.S Appl. No. 11/925,739", dated Dec. 23, 2013, 18 Pages.

"Non-Final Office Action Issued in U.S Appl. No. 11/925,739", dated Jan. 7, 2010, 19 Pages.

"Notice of Allowance Issued in U.S. Appl. No. 11/925,739", dated Aug. 8, 2014, 9 Pages.

"Final Office Action Issued in U.S Appl. No. 14/018,684", dated May 22, 2015, 20 Pages.

"Non-Final Office Action Issued in U.S Appl. No. 14/018,684", dated Aug. 18, 2015, 20 Pages.

"Non-Final Office Action Issued in U.S Appl. No. 14/018,684", dated Jan. 28, 2015, 16 Pages.

"Notice of Allowance Issued in U.S. Appl. No. 14/018,684", dated Mar. 10, 2016, 11 Pages.

Cebeci, et al., "Tree View Editing Learning Object Metadata", In Interdisciplinary Journal of Knowledge and Learning Objects, vol. 1, No. 1, Jan. 1, 2005, 10 Pages.

Connor, et al., "Using Persistence Technology to Control Schema Evolution", In Proceedings of the 1994 ACM Symposium on Applied Computing, Apr. 6, 1994, 10 Pages.

Gkoutos, et al., "CRAVE: A Database, Middleware and Visualization System for Phenotype Ontologies", In Journal Bioinformatics, vol. 21 Issue 7, Apr. 2005, 6 Pages.

Hunter, et al., "The Application of an Event-Aware Metadata Model to an Online Oral History Project", In Proceedings 4th European Conference on Research and Advanced Technology for Digital Libraries (ECDL), Sep. 18, 2000, 15 Pages.

Kunze, et al., "Editing Learning Object Metadata: Schema Driven Input of RDF Metadata with the OLR3-Editor", In Proceedings of the Semantic Authoring, Annotation and Knowledge Markup Workshop, 15th European Conference on Artificial Intelligence, Jul. 2002, 5 Pages.

(56) References Cited

OTHER PUBLICATIONS

Lee, et al., "The Architecture of TRUEVIZ: A Ground TRUth/Metadata Editing and VIsualiZing Toolkit", In Technical Report: LAMP-TR-062/CS-TR-4212/CAR-TR-959, Department of Computer Science, University of Maryland, Pattern Recognition 36(3), Feb. 2001, 22 Pages.

Wan et al., "Method and System for Metadata Reconciliation in a Data Warehouse", U.S. Appl. No. 10/849,425, filed May 18, 2004, Appendices A, B, & C, specification pp. 29-38.

* cited by examiner

METADATA DRIVEN REPORTING AND EDITING OF DATABASES

CROSS-REFERENCE TO RELATED APPLICATIONS

This application is a continuation of U.S. patent application Ser. No. 14/018,684, filed Sep. 5, 2013, and entitled "METADATA DRIVEN REPORTING AND EDITING OF DATABASES," and which issued as U.S. Pat. No. 9,372,876 on Jun. 21, 2016, which is a divisional of U.S. patent application Ser. No. 11/925,739, filed Oct. 26, 2007, and entitled "METADATA DRIVEN REPORTING AND EDITING OF DATABASES," and which issued as U.S. Pat. No. 8,903,842 on Dec. 2, 2014. The entire contents of each of the foregoing applications are incorporated by reference in their entireties.

BACKGROUND

Computers have become highly integrated in the workforce, in the home, and in mobile devices. Computers can process massive amounts of information quickly and efficiently. Software applications designed to run on computer systems allow users to perform a wide variety of functions including business applications, schoolwork, entertainment and more. Software applications are often designed to perform specific tasks, such as word processor applications for drafting documents, or email programs for sending, receiving and organizing email.

In some cases, software applications can be used to generate, edit and display data in the form of models. For example, models may be used by businesses and other entities to describe entities, processes, systems and other information. Some models may be referred to as flow diagrams, process flows, flowcharts, process diagrams and/or control charts. Others may be referred to as lists, tables, pie charts, or other forms of categorizing and displaying data. In some cases, models may be used to illustrate organizational relationships between resources in a system. These models are often referred to as organizational charts. In a broader sense, models may be used to show any type of relationship information between different objects.

Many times, however, software programs configured to generate, display and edit data are limited by the type of data. For example, software programs are often hard-coded to be able to generate, edit or navigate certain types of data, but not others. Furthermore, data categorization and display may be limited to certain layouts or display types based on the type of data. Thus, computer-run software applications used to generate, view, edit or navigate data sets may be rely on data type to determine which functionality will be available to the end user.

BRIEF SUMMARY

Embodiments described herein are directed to providing enhanced database editing capabilities. In one embodiment, a computer system receives a database query including a request to edit one or more data items in the database. The computer system determines which data items would be affected by the requested data item edit. Based on the determination, the computer system accesses those data items that would be affected by the requested data item edit. The computer system provides metadata for each data item that would be affected by the requested data item edit. The metadata includes instructions at least partly indicating how the edit is to be performed. The computer system also performs the edit to affect the data items according to at least a portion of the provided metadata, regardless of how the edit would otherwise have been performed based on existing knowledge about the affected data items.

In another embodiment, a computer system performs a method for providing enhanced data item reporting. The computer system receives a data item request that identifies which data items are to be reported. The computer system accesses a relational data store to determine which information sets are to be used for reporting the requested data items. Based on the determination, the computer system accesses those information sets that are to be used in the reporting the requested data items. The computer system then determines that metadata has been provided for at least one of the accessed information sets. The metadata includes instructions at least partially indicating how the data items are to be reported. The computer system also reports the data items according to the instructions in the provided metadata, regardless of how the data items are to be reported using the existing information sets.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

To further clarify the above and other advantages and features of embodiments of the present invention, a more particular description of embodiments of the present invention will be rendered by reference to the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION

Figure 1:
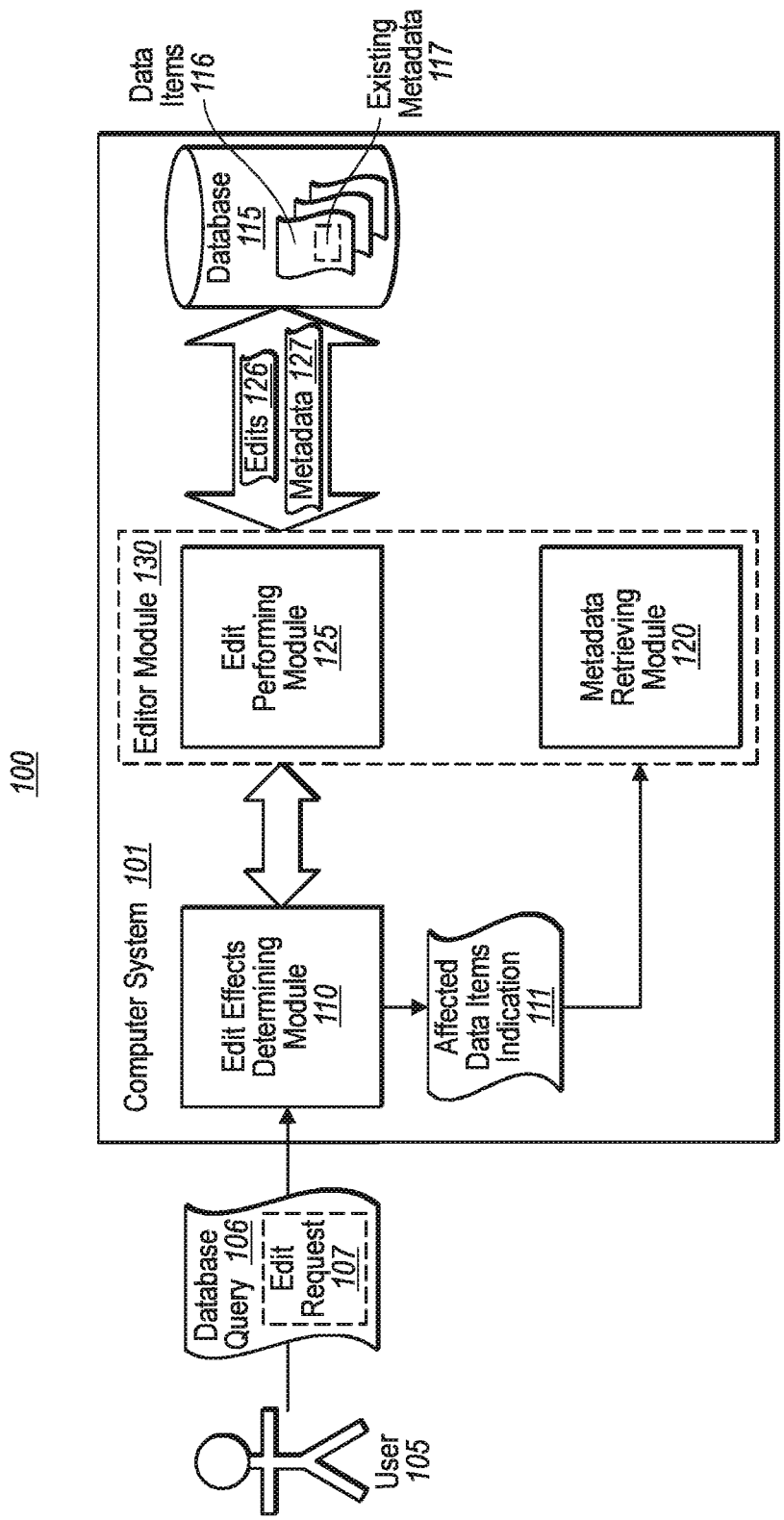
FIG. 1 illustrates a computer architecture in which embodiments of the present invention may operate including providing enhanced database editing capabilities.

Embodiments described herein are directed to providing enhanced database editing capabilities. In one embodiment, a computer system receives a database query including a request to edit one or more data items in the database. The computer system determines which data items would be affected by the requested data item edit. Based on the determination, the computer system accesses those data items that would be affected by the requested data item edit. The computer system provides metadata for each data item that would be affected by the requested data item edit. The metadata includes instructions at least partly indicating how the edit is to be performed. The computer system also performs the edit to affect the data items according to at least a portion of the provided metadata, regardless of how the edit would otherwise have been performed based on existing knowledge about the affected data items.

In another embodiment, a computer system performs a method for providing enhanced data item reporting. The computer system receives a data item request, the request including an indication of which data items to report. The computer system determines which information sets are to be used in the reporting of the requested data items. Based on the determination, the computer system accesses those information sets that are to be used in the reporting of the requested data items. The computer system provides metadata for each accessed information set. The metadata includes instructions at least partly indicating how the reporting is to be performed. The computer system also the data items according to at least a portion of the provided metadata, regardless of how the reporting would otherwise have been performed based on the existing information sets used to report the requested data items.

Embodiments of the present invention may comprise or utilize a special purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical storage media and transmission media.

Physical storage media includes RAM, ROM, EEPROM, CD-ROM or other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmission media can include a network and/or data links which can be used to carry or transport desired program code means in the form of computer-executable instructions or data structures and which can be accessed by a general purpose or special purpose computer. Combinations of the above should also be included within the scope of computer-readable media.

However, it should be understood, that upon reaching various computer system components, program code means in the form of computer-executable instructions or data structures can be transferred automatically from transmission media to physical storage media. For example, computer-executable instructions or data structures received over a network or data link can be buffered in RAM within a network interface card, and then eventually transferred to computer system RAM and/or to less volatile physical storage media at a computer system. Thus, it should be understood that physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

FIG. 1 illustrates a computer architecture 100 in which the principles of the present invention may be employed. Computer architecture 100 includes computer system 101. In some embodiments, computer system 101 may include edit effects determining module 110. Edit effects determining module 110 may be configured to receive database query 106 with edit request 107 from user 105. User 105 may be any type of computer user including a software developer, an end-user, or any other type of user.

Edit effects determining module 110 may be configured to analyze one or more effects of a proposed edit. For example, database 115 may contain data items 116 with existing metadata 117. Database 115 may be any type of database configured to store information including lightweight directory access protocol (LDAP) directories, universal description, discovery and integration (UDDI) registries, structured query language (SQL) databases, or any other type of information store. Data items 116 may include any type of informational item such as a software file, code portion, script, schema, file link or other item containing data. In some cases, user 105 may desire to edit one or more of the data items in repository 115. Thus, edit effects determining module 110 may be configured to receive a database query from the user.

Database query 106 may include any type of data request that is capable of interpretation by edit effects determining module 110. In some cases, database query 106 may include edit request 107. Edit request 107 may comprise a representation of those edits that user 105 desires to implement on data items 116. For example, edit request 107 may state that software files "A.doc," "B.txt," and "C.pdf" are to be deleted. Edits may include any type of data manipulation including creating, replacing, updating and/or deleting. Thus, edit request 107 may include the type of edit to perform as well as those entities that are to be affected by the edit. In some cases, edit effects determining module 110 may be configured to access edit request 107 and database 115 to determine which data items would be affected by edit request 107.

Edit effects determining module 110 may send effected data items indication 111 indicating which data items 116 would be affected by edit request 107 to metadata providing module 120. In some embodiments, metadata providing module 120 may be configured to receive effected data items indication 111 and provide metadata for each data item that is to be affected by edit request 107. In some cases, metadata may comprise information that can be used to designate how a data item is to be edited. In other cases, the metadata may state which edits are allowed to be performed on a certain data item or group of data items. Metadata may also define relationships between data items that are to be preserved throughout the editing process. In some cases, at least some of data items 116 have existing metadata 117. This metadata may be overwritten, appended or otherwise modified by the metadata provided by metadata providing module 120. Metadata may be defined by a user (e.g. user 105) and inserted automatically by metadata providing module 120.

Computer system 101 may also include edit performing module 125. In some embodiments, edit performing module 125 may be configured to perform edits to data items. As mentioned above, edits may include any of creating, replacing, updating, deleting or any other manipulation of a data item. In some cases, edit performing module 125 may perform the edits indicated in edit request 107. In other cases, edit performing module 125 may perform the edits according to metadata provided by metadata providing module 120 and/or existing metadata 117. Modules 120 and 125 may be subcomponents of editor module 130. Editor module 130 may be configured to communicate with database 115, sending and receiving, among other things, data items 116, existing metadata 117, metadata provided by module 120 and edits 126.

Figure 2:
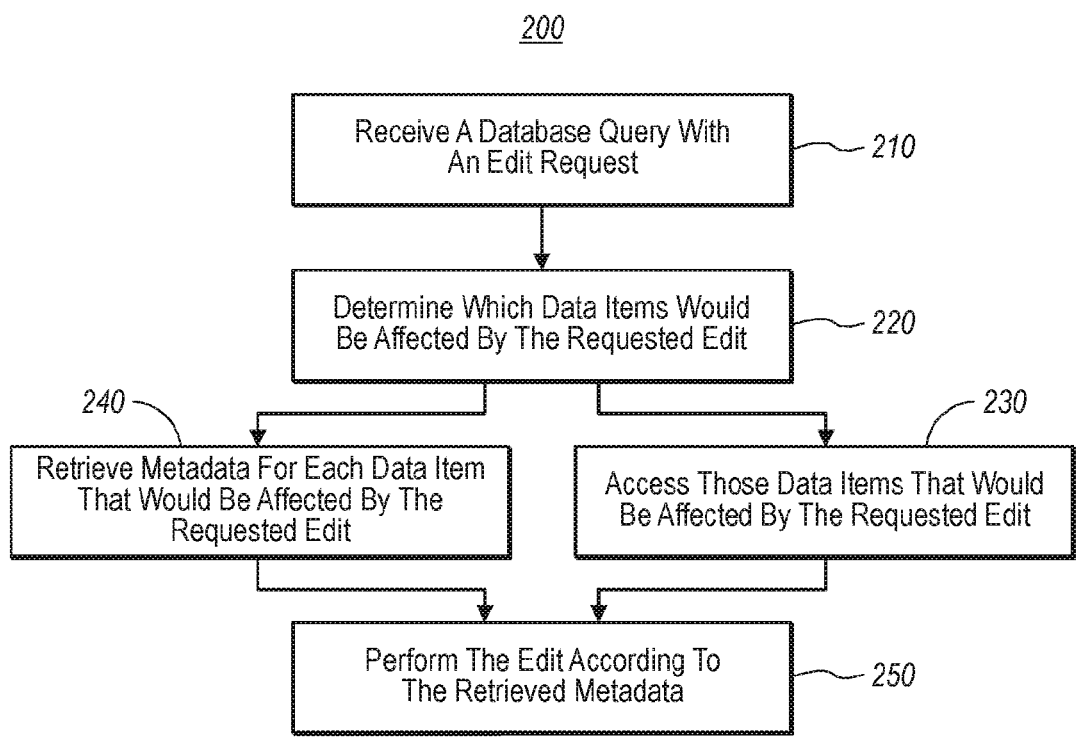
FIG. 2 illustrates a flowchart of an example method for providing enhanced database editing capabilities.

FIG. 2 illustrates a flowchart of a method 200 for providing enhanced database editing capabilities. The method 200 will now be described with frequent reference to the components and data of environment 100.

Method 200 includes an act of receiving a database query including a request to edit one or more data items in the database (act 210). For example, edit effects determining module 110 may receive database query 106 including a request 107 to edit one or more data items 116 in database 115. As explained above, database query 106 may include edit request 107 which has information indicating edits that are to be performed to one or more data items in database 115. In some cases, at least one of the data items is a schema. Thus, edit request 107 may include a request to create, replace, update and/or delete a schema stored in database 115.

Method 200 includes an act of determining which data items would be affected by the requested data item edit (act 220). For example, edit effects determining module 110 may analyze one or more potential effects of edit request 107 to determine which of data items 116 would be affected by the requested data item edit. In some cases, the potential effects of the requested edit include one or more of creating, replacing, updating and deleting another data item. For example, one edit may trigger a chain of edits where one data item has dependencies or other relationships with other data items. For instance, a word processing document may link to a spreadsheet document for some of its information. Thus, if the spreadsheet document is updated, moved, or otherwise edited, the word processing document will likely have a relationship with the spreadsheet document that states that the word processing document is to be updated with any edits made to the spreadsheet document.

In some cases, effected data items indication 111 may include a list of those data items that would be affected by the requested data item edit. This may be useful in scenarios where a user wants to see all of the data items that would be affected by one or more proposed edits. Using the list, the user may determine that the proposed edit(s) are unadvisable or, alternatively, that the proposed edit(s) only affect a small number data items and is ok to implement. The list may also be used in an automated process where, if a threshold level of data items would be affected by the edit, the edit will not be performed. Other permutations on this theme are also possible.

Method 200 includes, based on the determination, an act of accessing those data items that would be affected by the requested data item edit (act 230). For example, based on indication 111 of which data items would be affected by the requested data item edit, metadata providing module 120 may access those data items 116 that would be affected by requested data item edit 107. Additionally or alternatively, based on indication 111, edit performing module 125 may access data items 116.

Method 200 includes an act of providing metadata for each data item that would be affected by the requested data item edit, the metadata including instructions at least partly indicating how the edit is to be performed (act 240). For example, based on effected data items indication 111, metadata providing module 120 may provide metadata for each data item 116 that would be affected by edit request 107, where the metadata includes instructions at least partly indicating how the edit is to be performed. As explained above, metadata provided by metadata providing module 120 may overwrite existing metadata 117 or may be appended to the existing metadata. Thus, the metadata provided by metadata providing module 120 may alter the method in which data items are edited. Furthermore, the metadata may alter the number, type or even specific data items which are to be edited according to edit request 107.

In some cases, the metadata provided by metadata providing module 120 may be stored separately in database 115, apart from the data items 116. In other cases, the metadata may be appended to existing data items as part of a file header or in other parts of the data item. In some embodiments, metadata is provided for each data item in the database 115, regardless of whether the data item is to be affected by the requested edit 107. Additionally or alternatively, the metadata provided by metadata providing module 120 may be linked, symbolically or otherwise, to existing metadata 117 corresponding to the affected data items, instead of or in addition to overwriting/appending existing metadata 117.

Method 200 includes an act of performing the edit to affect the data items according to at least a portion of the provided metadata, regardless of how the edit would otherwise have been performed based on existing knowledge about the affected data items (act 250). For example, edit performing module 125 may perform the edit(s) indicated in edit request 107 to affect the data items 116 according to at least a portion of the metadata provided by metadata providing module 120, regardless of how the edit(s) would otherwise have been performed based on the existing metadata 117 of the affected data items. Thus, in cases where an edit would normally have been performed based on the existing metadata 117 corresponding to the affected data items, the edit will be performed according to at least a portion of the metadata provided by metadata providing module 120. As mentioned above, the requested edit 107 may be performed by edit performing module 125 entirely according to existing metadata 117, portions of existing metadata and portions of metadata provided by module 120, or entirely according to metadata provided by module 120. In some cases, after the edit has been performed, updated information relating to the updated data items (possibly even including the edited data items) may be sent to database 115 via edits 126 where the updated data items may overwrite or supplement data items 116.

Figure 3:
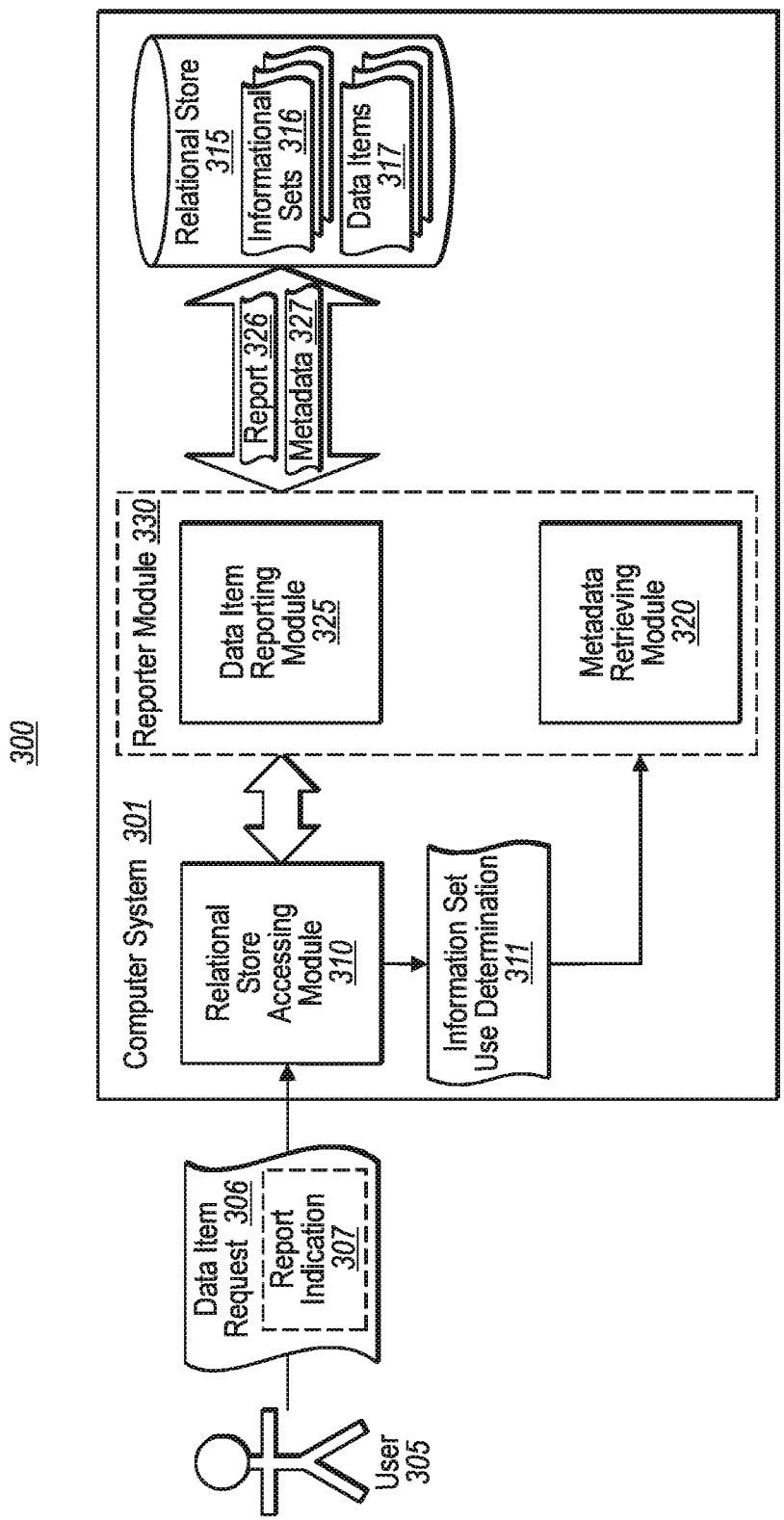
FIG. 3 illustrates a computer architecture in which embodiments of the present invention may operate including providing enhanced data item reporting.

FIG. 3 illustrates a computer architecture 300 in which the principles of the present invention may be employed. Computer architecture 300 includes computer system 301. In some embodiments, computer system 301 may include relational store accessing module 310. Relational store accessing module 310 may be configured to receive data item request 306 with report indication 307 from user 305. User 305 may be any type of computer user including a software developer and/or an end-user. Reporting, as the term is used herein, may include any type of data presentation, browsing, retrieval or other means of reporting information. Relational store accessing module 310 may access relational store 315 in response to receiving data item request 306. Data item request 306 may include any type of informational request configured to obtain some type of information from a relational store. Relational store 315 may be any type of directory, registry, database, or other storage system configured to store data. Relational store 315 may include information sets 316 and data items 317.

Data items 317 may include any type of informational item such as a software file, code portion, script, schema, file link or other item containing data. Information sets 316 may be queries, read/write messages, code portions, scripts or other means of accessing information. In some embodiments, information sets 316 are used to access and/or report data items 317. Report indication 307 may indicate which data items 317 are to be reported, as input by user 305 in data item request 306. Relational store accessing module 310 may determine which information sets are to be used in reporting certain data items (e.g. those data items indicated in data item request 306) and send information set use determination 311 to metadata providing module 320.

Metadata providing module 320 may be configured to provide metadata to data items 317 in relational store 315. For example, metadata providing module 320 may provide metadata for those data items that are to be reported as indicated in report indication 307. Data item reporting module 325 may be configured to report data items to user 305. In some cases, data item reporting module will report those data items requested in data item request 306 according to metadata provided by metadata providing module 320. Metadata providing module 320 and data item reporting module 325 may be included in reporter module 330. Reporter module 330 may be configured to communicate with relational store 315 including sending and receiving informational sets 316, data items 317, metadata provided by module 320 and/or reports 326 which may include information on reporting and/or reported data items.

Figure 4:
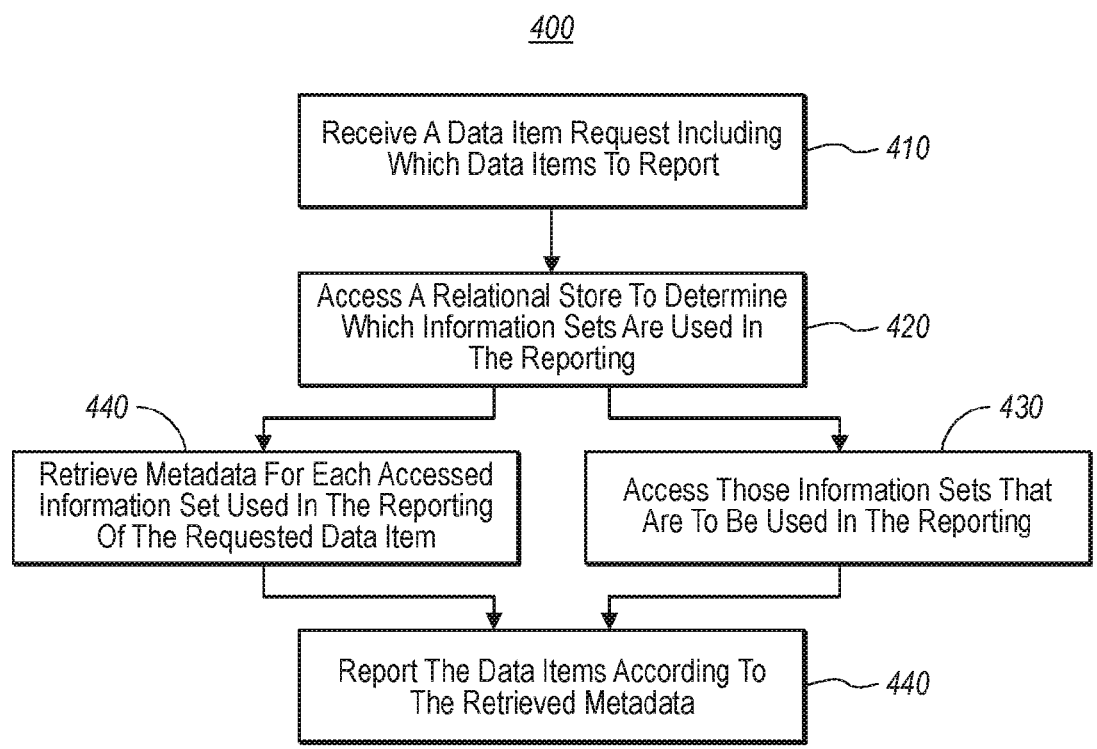
FIG. 4 illustrates a flowchart of an example method for providing enhanced data item reporting.

FIG. 4 illustrates a flowchart of a method 400 for providing enhanced data item reporting. The method 400 will now be described with frequent reference to the components and data of environment 300 of FIG. 3.

Method 400 includes an act of receiving a data item request, the request including an indication of which data items to report (act 410). For example, relational store accessing module 310 may receive data item request 306, where the request includes an indication 307 of which data items 317 to report to user 305. In some embodiments, at least one of the data items is a schema. Report indication 307 may include a list of data items to report, or alternatively, may include instructions to report certain types or groups of data items, or may include instructions to report certain data items along with any accompanying data items as defined by existing metadata and/or the information sets used to access and report the data.

Method 400 includes an act of accessing a relational store to determine which information sets are used in the reporting of the requested data items (act 420). For example, relational store accessing module may access relational store 315 to determine which information sets 316 are used in the reporting of the data items requested in data item request 306. In some embodiments, relational store accessing module 310 may provide a list of those information sets used in the reporting of the requested data items. The list may include those scripts, read/write messages, code portions used to access the requested data items. User 305 may use the list to determine how the data items are being reported, and in which ways, if any, the user may want to alter how the data items are being reported. In some cases, user 305 may input metadata to be provided to information sets 316 by metadata providing module 320. In other cases, metadata providing module may provide the metadata used to alter how data items are reported to the user, as explained below.

Method 400 includes, based on the determination, an act of accessing those information sets that are to be used in the reporting of the requested data items (act 430). For example, metadata providing module 320 may access those information sets indicated as being used in information set use determination 311. Additionally or alternatively, data item reporting module 325 may access those information sets indicated as being used in information set use determination 311.

Method 400 includes an act of providing metadata for each information set, the metadata including instructions at least partly indicating how the reporting is to be performed (act 440). For example, based on information set use determination 311, metadata providing module 320 may provide metadata for each information set 316 used in the reporting of those data items requested in data item request 306, where the metadata includes instructions at least partly indicating how the reporting is to be performed. In some cases, user 305 may desire to alter how and/or which data items are being reported. Metadata providing module 320 may add metadata or overwrite existing metadata in information sets 316 in order to alter how and/or which data items are reported.

Similar to metadata providing module 120, metadata providing module 320 may entirely overwrite any existing metadata in information sets 316. Or, module 320 may overwrite some portion of existing metadata. Thus, when information sets 316 are used to report data items according to data item request 306, different data items and/or different information sets may be used in the reporting. In some cases, the metadata provided by module 320 may be linked to any existing metadata corresponding to the reported data items.

Method 400 includes an act of reporting the data items according to at least a portion of the provided metadata, regardless of how the reporting would otherwise have been performed based on the existing information sets used to report the requested data items (act 440). For example, data item reporting module may report the requested data items according to at least a portion of the metadata provided by metadata providing module 320, regardless of how the reporting would otherwise have been performed based on any existing metadata in the information sets used to report the requested data items 117. Thus, in cases where requested data items would have been reported according to existing metadata in the information sets used to report the data items, the provided metadata provided by module 320 is used to determine how and which data items to report. This metadata may be specified by the computer system or by user 305. In some cases, metadata is provided for each information set 316 in relational store 315. This may be advantageous in cases where each of the data items is interrelated and the information sets used to report one are similar to those used to report the other data items. Thus, each information set may be altered by metadata so that reporting for each data item is performed in a similar manner.

Thus, enhanced data item editing and reporting capabilities may be provided to a user desiring to edit and/or report certain data items. Such a system may be fully customizable, allowing the user to dictate how data items are edited, viewed and reported and allow the user to input metadata used to define the processes used to do so.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

We claim:

1. A computer system, comprising:
   one or more processors;
   system memory; and
   one or more computer-readable storage media having stored thereon computer-executable instructions that are executable by the one or more processors to cause the computer system to link database metadata for reporting data items in a customizable manner, the computer-executable instructions including instructions that are executable to cause the computer system to perform at least the following:
      receive a user request that indicates one or more requested data items that are stored in a data store and that are to be reported in response to the request;
      based at least on receiving the request, identify one or more information sets that are stored at the data store and that define one or more queries for accessing the one or more requested data items from the data store using at least one of: one or more scripts, one or more read/write messages, or one or more code portions;
      report to the user a list of the identified one or more information sets, the list of the identified information sets usable to determine how the one or more requested data items will be reported according to pre-existing metadata stored at the data store, the pre-existing metadata comprising one or more first instructions indicating how the one or more information sets are to present the one or more requested data items;
      based at least on reporting the list of the identified information sets to the user, receive input metadata that includes one or more second instructions altering how the one or more information sets are to present the one or more requested data items according to the pre-existing metadata;
      link the pre-existing metadata with the input metadata to create combined metadata, the linking causing at least one of the one or more first instructions of the pre-existing metadata to override at least one of the one or more second instructions of the input metadata, while preserving the overridden at least one of the one or more second instructions;
      store the combined metadata in the data store for use by subsequent requests for reporting the one or more requested data items; and
      present the one or more requested data items according to the combined metadata.

2. The computer system of claim 1, wherein the data store comprises a structured query language (SQL) database.

3. The computer system of claim 1, wherein at least one of the one or more data items comprises a schema.

4. The computer system of claim 1, wherein the input metadata is specified by the user.

5. The computer system of claim 1, wherein the data store comprises one or more of a directory, a registry, or a database.

6. The computer system of claim 1, wherein the one or more information sets comprises relational data sets.

7. A method, implemented at a computer system that includes one or more processors, for linking database metadata for reporting data items in a customizable manner, the method comprising:
   receiving a user request that indicates one or more requested data items that are stored in a data store and that are to be reported in response to the request;
   based at least on receiving the request, identifying one or more information sets that are stored at the data store and that define one or more queries for accessing the one or more requested data items from the data store using at least one of: one or more scripts, one or more read/write messages, or one or more code portions;
   reporting to the user a list of the identified one or more information sets, the list of the identified information sets usable to determine how the one or more requested data items will be reported according to pre-existing metadata stored at the data store, the pre-existing metadata comprising one or more first instructions indicating how the one or more information sets are to present the one or more requested data items;
   based at least on reporting the list of the identified information sets to the user, receiving input metadata that includes one or more second instructions altering how the one or more information sets are to present the one or more requested data items according to the pre-existing metadata;
   linking the pre-existing metadata with the input metadata to create combined metadata, the linking causing at least one the one or more first instructions of the pre-existing metadata to override at least one of the one or more second instructions of the input metadata, while preserving the overridden at least one of the one or more second instructions;
   storing the combined metadata in the data store for use by subsequent requests for reporting the one or more requested data items; and
   presenting the one or more requested data items according to the combined metadata.

8. The method of claim 7, wherein the data store comprises a structured query language (SQL) database.

9. The method of claim 7, wherein at least one of the one or more data items comprises a schema.

10. The method of claim 7, wherein the input metadata is specified by the user.

11. The method of claim 7, wherein the data store comprises one or more of a directory, a registry, or a database.

12. The method of claim 7, wherein the one or more information sets comprises relational data sets.

13. A computer program product comprising one or more hardware storage devices having stored thereon computer-executable instructions that are executable by one or more processors of a computer system to cause the computer system to link database metadata for reporting data items in a customizable manner, the computer-executable instructions including instructions that are executable to cause the computer system to perform at least the following:

- receive a user request that indicates one or more requested data items that are stored in a data store and that are to be reported in response to the request;
- based at least on receiving the request, identify one or more information sets that are stored at the data store and that define one or more queries for accessing the one or more requested data items from the data store using at least one of: one or more scripts, one or more read/write messages, or one or more code portions;
- report to the user a list of the identified one or more information sets, the list of the identified information sets usable to determine how the one or more requested data items will be reported according to pre-existing metadata stored at the data store, the pre-existing metadata comprising one or more first instructions indicating how the one or more information sets are to present the one or more requested data items;
- based at least on reporting the list of the identified information sets to the user, receive input metadata that includes one or more second instructions altering how the one or more information sets are to present the one or more requested data items according to the pre-existing metadata;
- link the pre-existing metadata with the input metadata to create combined metadata, the linking causing at least one of the one or more first instructions of the pre-existing metadata to override at least one of the one or more second instructions of the input metadata, while preserving the overridden at least one of the one or more second instructions;
- store the combined metadata in the data store for use by subsequent requests for reporting the one or more requested data items; and
- present the one or more requested data items according to the combined metadata.

14. The computer program product of claim 13, wherein the data store comprises a relational data store, and wherein the one or more information sets comprise relational data sets.

* * * * *